Jan. 1, 1957     J. L. JENSEN     2,776,382
VOLTAGE AND CURRENT REGULATION

Filed July 25, 1955     2 Sheets-Sheet 1

INVENTOR.
JAMES L. JENSEN
BY *Frederick E. Lange*
ATTORNEY

Jan. 1, 1957  J. L. JENSEN  2,776,382
VOLTAGE AND CURRENT REGULATION
Filed July 25, 1955  2 Sheets-Sheet 2

INVENTOR.
JAMES L. JENSEN
BY Frederick E. Lange
ATTORNEY

REISSUED
JULY 14, 1959
RE.24,671

2,776,382

VOLTAGE AND CURRENT REGULATION

James Lee Jensen, St. Louis Park, Minn., assignor to Minneapolis-Honeywell Regulator Company, Minneapolis, Minn., a corporation of Delaware Application July 25, 1955, Serial No. 524,039

12 Claims. (Cl. 307—97)

This invention relates to new and improved transistor circuitry for electronic regulation of voltage and current. Numerous circuits have been proposed and tried in the field of electronic voltage regulation, many of them being of a series regulator type, having an electron discharge tube or transistor connected in series with the voltage source and controlled by the output voltage, to act as a variable impedance in the supply lead to the load, thereby maintaining a constant voltage across the load device. In the above method of regulation an appreciable amount of power may be dissipated in the regulating device thus reducing the efficiency of the apparatus and requiring means to remove the heat being generated in the regulating device. In my invention the regulating transistor is operated as a switch, rather than as a variable impedance, the latter being common in the art. By my method a minimum amount of power is lost in the regulating apparatus.

An object of this invention is to provide an improved voltage regulator apparatus by the use of novel transistor circuitry.

Another object of the invention is to provide a transistor voltage regulator circuit which utilizes switching principles to increase limits and efficiency of transistor operation as a current control device.

Figure 4:
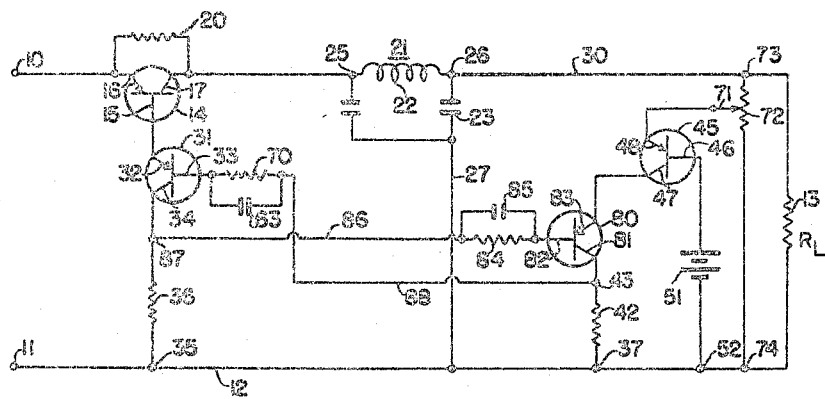
Figure 5:
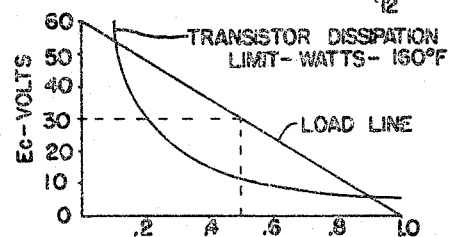

These and other objects of the invention will be understood upon consideration of the accompanying specification, claims and drawings of which:

Figures 1 to 4 are embodiments of the invention shown in schematic form, and disclose circuits utilizing transistors to produce a regulated output potential, Figure 5 is a typical characteristic plot of a power transistor collector electrode characteristic.

FIGURE 1

Figure 1:
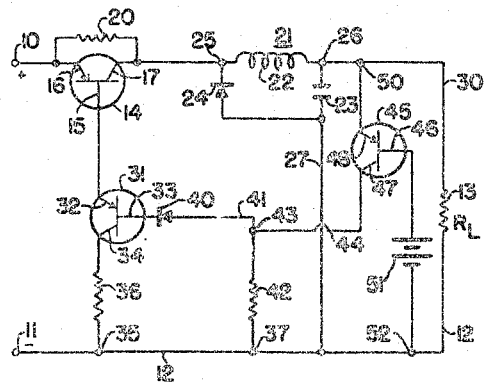

Referring now to Figure 1 there is shown a pair of input terminals 10 and 11 connected to a source of unregulated potential, not shown. The negative terminal 11 is connected by means of a conductor 12 to the lower terminal of a load device 13, here shown as a resistance. A junction power transistor 14 shown as a PNP transistor, comprising a base electrode 15, an emitter electrode 16 and a collector electrode 17, has its emitter 16 connected to the positive input terminal 10. Collector electrode 17 of transistor 14 is connected to the input terminal 25 of a conventional type filter 21 comprising a series choke 22 and a capacitor 23 connected in shunt. An output terminal 26 of the filter is connected to the upper terminal of load 13 by a conductor 30. Thus a current path may be traced from positive terminal 10 through the transistor 14 from emitter to collector, through filter 21, conductor 30, load 13 and conductor 12 back to negative input terminal 11.

The base electrode 15 of transistor 14 is connected to emitter electrode 32 of a junction transistor 31. Transistor 31 also includes a base electrode 33 and a collector 34. Collector 34 is connected through a resistor 36 to the conductor 12 at a junction 35. Base electrode 33 is connected to the conductor 12 at a junction 37 through a zener diode 40, a conductor 41, and a resistor 42.

A junction transistor 45 has a base electrode 46 a collector electrode 47, and an emitter electrode 48. Collector electrode 47 is connected by a conductor 44 to a junction 43 on conductor 41 which connects diode 40 to resistor 42. Emitter 48 is directly connected to a junction 50 on conductor 30 and base electrode 46 is connected to a voltage reference 51, shown as a battery. The opposite terminal of the reference battery is connected to conductor 12 at a junction 52. Reference 51 may also be in the form of a zener diode or other suitable voltage reference.

*Operation of Figure 1*

The operation of Figure 1 will become apparent upon a consideration of the following discussion. It is desired to maintain a regulated D. C. potential across the load device 13. An unregulated source of potential is applied across terminal 10 and 11. Let us assume for purposes of explanation that the potential existing across load 13 is slightly lower than the desired regulating potential and that transistor 14 is in a state of conduction which tends to increase the output potential. Under these conditions transistor 31 is also conducting and transistor 45 is cutoff. In Figure 1 the output potential is controlled by the magnitude of reference potential 51, as will be explained. With transistor 14 conducting the output potential continues to rise until it is approximately equal to the reference potential 51. At this point base current begins to flow in transistor 45 and thereby allows current to flow in the collector circuit, and through resistor 42 to the negative conductor 12.

The reference 51 may be a zener diode (not shown) or the like so that no base current flows in the transistor 45 until the output potential exceeds the zener breakdown voltage, at which time current flows from the positive output conductor 30, emitter 48 to base 46, and through the zener diode to negative output conductor 12, thereby causing transistor 45 to conduct.

During the time transistor 45 is maintained at cutoff substantially no collector current flows and therefore the potential drop across resistor 42 due to the collector current is essentially zero. A circuit may be traced from the input terminal 10 to emitter 16 of transistor 14, to base 15, to emitter 32 of transistor 31, to base 33, to zener diode 40, conductor 41, resistor 42, to conductor 12 at junction 37. Another path may also be traced from emitter 32 of transistor 31, to collector 34, and through a resistor 36 to the conductor 12 at junction 35. In order for switching transistor 14 to be conducting it is necessary for transistor 31 to be conductive also, as transistor 31 controls the base current of transistor 14. The potential drop from emitter 16 of transistor 14 to the base 33 of transistor 31 is relatively small since the emitter to base diodes of the transistors present a relatively low impedance to currents flowing in the forward direction through the diodes. The base current of transistor 31 is blocked, however, by the zener diode 40 unless the zener voltage is exceeded so that the diode conducts. As was previously stated, when transistor 45 is cutoff, the voltage drop across resistor 42 is very small so that the potential on conductor 41 connecting to diode 40 approaches that on conductor 12. Also as previously noted, the potential drop between input terminal 10 and base electrode 33 is relatively small so that a large percentage of the input voltage appears across zener diode 40 to exceed its zener breakdown potential and render it conductive, thereby allowing transistors 31 and 14 to be conductive.

As previously stated, when transistor 14 conducts, the regulated output potential continues to rise until transistor 45 commences to conduct current. The collector current of transistor 45 flowing through resistor 42 causes a substantial potential drop across the resistor which is sufficient to decrease the potential across zener diode 40 to a value below the zener potential required to maintain conduction. With zener diode 40 no longer conducting, no base current flows in transistor 31 which then becomes nonconductive. The nonconduction of transistor 31 also cuts off transistor 14. If desired the amplifier transistor 31 may be eliminated and the base electrode 15 of transistor 14 can be connected directly to zener diode 40.

The filter 21 which has stored up energy during the conduction of transistor 14 now supplies the energy to the load. Diode 24 is a protective device to prevent voltage transients of inductance 22 from damaging transistor 14.

As the energy level of the filter falls and the output potential begins to drop, the emitter 48 of transistor 45 tends to become negative with respect to the base 46 and transistor 45 becomes again nonconducting. The potential drop across the resistor 42 due to the conduction of transistor 45 disappears and there is again sufficient potential across diode 40 to exceed the zener breakdown allowing transistors 14 and 31 to again conduct, repeating the cycle.

The circuit of Figure 1 allows a relatively large current to be controlled while limiting to a minimum the power expended in the controlling device. It is noted that in my invention the transistor 14 is operated as a switch, being cutoff during a portion of the cycle and acting substantially as a zero impedance during the remaining portion of the cycle. The amount of control exercised varies the percentage on-time of transistor 14.

Figure 5 shows a typical collector characteristic for a Honeywell 2N57 power transistor which has been used successfully for transistor 14. The maximum allowable collector voltage for a 2N57 is 60 volts and the maximum allowable collector current is 1 ampere. A 60 ohm resistive load line has been drawn in Figure 5 which passes through both limits. A dotted line has been sketched in Figure 5 to show the operating point at which maximum power is dissipated within the transistor. This point is at 30 volts and .5 ampere resulting in 15 watts of power being dissipated within the transistor, predominantly in the resistance of the collector junction.

A third limit in the operation of transistors, in addition to the voltage and current limits, is a power limit. The power limit is predominantly a function of the ability to dissipate the heat generated within the transistor. A curve has been sketched in Figure 5 which shows a typical transistor power limit of 6 watts for a temperature of about 160° F. for a 2N57 transistor. It can be seen that the transistor can safely operate at a high current together with a low collector voltage, or at a condition of relatively low collector current together with a relatively high collector potential, since near the extremes of the load line the power dissipation limit is not exceeded. In my invention this principle is utilized; the transistor operating substantially all of the time in the region near the extremes of the load line consequently allowing a large power to be controlled with very low transistor dissipation.

It becomes clear therefore that my invention which utilizes the power transistor 14 as a switch, permits the control of a much larger amount of power than is possible in the conventional regulator. For example, let us again assume we are using a 2N57 power transistor for transistor 14, and are operating at the limits previously mentioned. Theoretically then we can control power approaching 60 watts by the switching method, under most operating conditions, while if the transistor were being modulated and operating with the 6 watt power dissipation limit the maximum power controlled would also be limited to a relatively small value compared to the 60 watts previously discussed.

FIGURE 2

Figure 2:
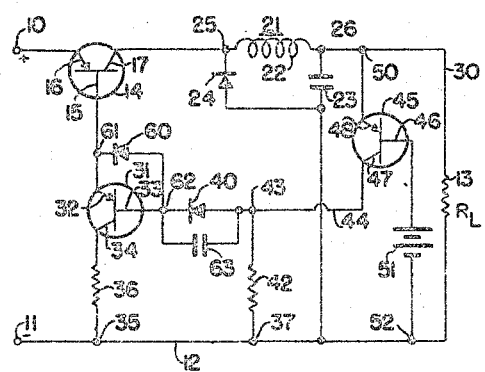

The circuit of Figure 2 is in most respects identical to Figure 1 and operates substantially in the same manner as described for Figure 1. Figure 1 is basically a simplified form of Figure 2 and the same numbers are used in Figure 2 where the components are identical to Figure 1. In Figure 2 a diode 60 is connected in parallel with the emitter-base junction of the transistor 31. The diode 60 is connected so that the direction of easy current flow of the diode is opposite to the forward direction of the emitter-base junction diode of transistor 31. A capacitor 63 is connected in parallel with the zener diode 40.

In the operation of Figure 2, similar to the operation previously explained, when the output potential is low transistor 45 is cutoff and transistors 14 and 31 are conducting. Capacitor 63 charges to the zener breakdown potential of diode 40. As the output potential of the regulator rises transistor 45 becomes conductive and the collector current flowing through resistor 42 causes an increased potential drop across the resistor, junction 43 thereby becoming substantially more positive. With junction 43 more positive the potential charge on capacitor 63 drives base electrode 33 of transistor 31 positive with respect to its emitter thus actually injecting current into the base to cut the transistor off sharply. Junction 62 between diode 40 and base 33 is also driven positive with respect to input terminal 10 because current also flows from capacitor 63 through diode 60 and into the base 15 of transistor 14. Forcing current into base 15 has the effect of cutting off transistor 14 more sharply to decrease to a minimum the time required to switch from a condition of conduction to cutoff. If it is desirable transistor 31 and diode 60 may be eliminated and base electrode 15 be connected directly to capacitor 63 and zener diode 40.

FIGURE 3

Figure 3:
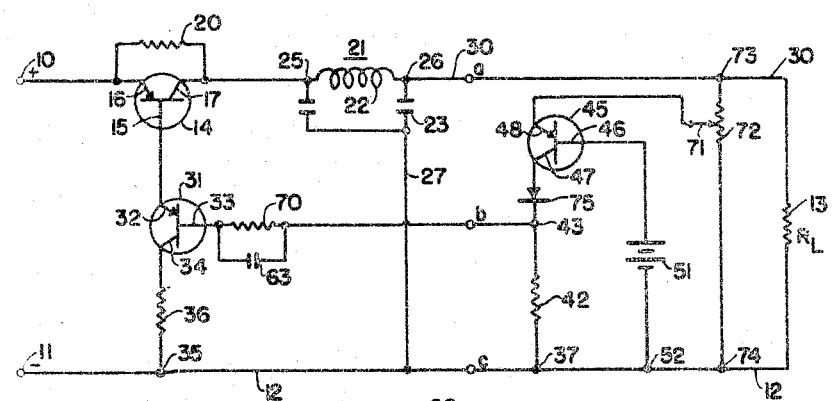

Figure 3 is a modification of Figure 1 and one of the main differences is in the use of a parallel resistor-capacitor combination between the base 33 of transistor 31 and the junction 43. The resistor 70 and the capacitor 63 are chosen to provide a desired time constant for the input signal to transistor 31. Another difference is that emitter electrode 48 of transistor 45 is connected to a wiper 71 of a potentiometer 72. The potentiometer 72 is connected across the output conductors 30 and 12 at junctions 73 and 74 respectively. A diode 75 is connected between the collector 47 of transistor 45 and the collector load resistor 42.

The operation of Figure 3 is in some respects different from that of Figures 1 and 2. The connection of emitter electrode 48 to the wiper 71 of potentiometer 72 provide for regulation of output potentials larger than the reference 51. This is possible since wiper 71 can be adjusted to pick off any portion of the output potential and compare it against the reference voltage to control the regulator. Another difference in the operation of Figure 3 is that it is constructed so that transistors 31 and 14 may be cut off for a limited time which is determined by the RC constant of resistor 70 and capacitor 63 in the input circuit to transistor 31.

Let us assume the operating conditions when transistors 14 and 31 are conductive so that the output potential to the load 13 is rising. When the potential on wiper 71 is approximately equal to the reference 51, transistor 45 commences conducting and a substantially large potential drop appears across resistor 42 due to the collector current flowing therethrough. This positive going potential change is applied through capacitor 63 to the base 33 of transistor 31 thereby driving the transistor 31 into cutoff and thereby also cutting off transistor 14. Transistor 31 is maintained cutoff until transistor 45 again becomes nonconductive due to a decrease in the output potential. The time constant of the combination of resistor 70 and capacitor 63 is chosen to be long compared with the normal fall of the output potential which is determined by capacitor 23 and load 13. This is to prevent instability of the control which would result if capacitor 63 were to discharge sufficiently to allow transistor 31 to come on before transistor 45 ceased conducting.

Figure 3A:
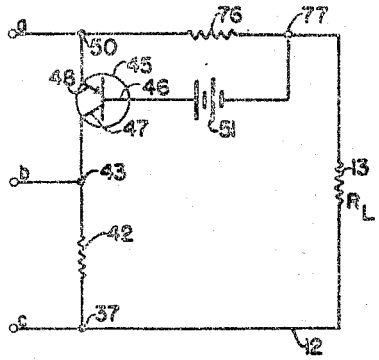

Figure 3a is a modification of Figure 3 to provide current regulation for the circuit of Figure 3. The circuit of Figure 3a is connected to terminals a, b, and c of Figure 3 in place of the voltage reference circuit when it is desired to provide current regulation. A resistor 76 is connected in series with conductor 30 between junction 50 and the load device 13. The reference 51 connects the base electrode 46 to a terminal 77 between resistor 76 and load device 13. Resistor 76 or reference 51 may be of variable magnitude if desirable. In operation transistor 45 remains cutoff until the current flowing to the load 13 increases sufficiently to cause a potential drop across resistor 76 equal to the reference potential. At this time transistor 45 commences to conduct cutting off transistors 14 and 31 as previously described.

Figure 3B:
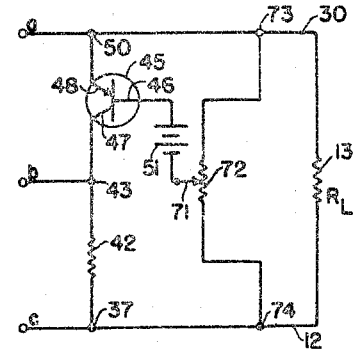

Figure 3b shows an alternate voltage reference circuit for use with Figure 3. The base electrode 46 is connected through the reference 51 to the wiper 71 of potentiometer 72 rather than the emitter to wiper 71 as in Figure 3. This has the advantage of maintaining emitter 48 at the potential on conductor 30 and assures that the potential at collector 47 can under all operating conditions rise sufficiently to cut off transistor 31.

FIGURE 4

Figure 4 is another modification of the regulator and again the same identifying numerals are used as were used in the preceding figures where the components are the same. This circuit includes an additional transistor 80 having a collector electrode 81, a base electrode 82 and an emitter electrode 83. The circuit is in many respects similar to Figures 1 and 3 and the explanation of components and connections need not be repeated for the like parts. Emitter electrode 83 of transistor 80 is connected to collector electrode 47 of transistor 45. Collector electrode 81 is connected to the conductor 12 at junction 37 through the resistor 42. The base electrode 82 is connected through a parallel connected resistor 84, and a capacitor 85, and through a conductor 86 to a junction 87 between the collector 34 of transistor 31 and the resistor 36. The base electrode 33 is connected through parallel connected resistor 70 and condenser 63, and a conductor 88 to junction 43 between collector 81 and resistor 42.

In operation of Figure 4 the transistors 31 and 80 operate as a free running multivibrator. When transistor 31 is conductive transistor 14 is also conductive so that current is flowing into the output circuit from the source terminals. The base current flowing out of transistor 31 develops a potential drop across resistor 70 and capacitor 63 is charged. When transistor 31 begins conducting the potential at junction 87 becomes much more positive due to the potential drop across resistor 36 resulting from the increased collector current. This change in potential biases transistor 80 to cutoff. As capacitor 85 discharges the potential on the base 82 is no longer sufficient to maintain transistor 80 cutoff and it begins to conduct current, developing an IR drop across resistor 42 to drive transistor 31 into cutoff. Transistor 31 remains cutoff until capacitor 63 discharges sufficiently or until the emitter current to transistor 80 is interrupted, as will be explained.

Transistor 80 can only conduct when transistor 45 is also conductive. As was previously explained, transistor 45 may conduct whenever the output potential exceeds the reference potential. Let us assume first a condition where the output potential has dropped sufficiently to cut off transistor 45. Transistor 80 is now no longer supplied emitter current and therefore is conducting no current. Transistors 31 and 14 are conductive and the output potential rises. As soon as transistor 45 becomes conductive transistor 80 also conducts current and the multivibrator operates as such, alternately switching transistor 14 from a conductive to a nonconductive state. The proportion of on time-off time of transistor 14 can be controlled by a choice of values for the RC values in the base circuits of transistors 31 and 80. The natural period of "off-time" for transistor 31 may be shortened if the output potential falls, cutting off transistor 45, during this period.

In general while I have shown certain specific embodiments of my invention, it is to be understood that this is for the purpose of illustration and that my invention is to be limited solely by the scope of the appended claims.

I claim as my invention:

1. Regulating means for supplying current from an unregulated source to a load device comprising: first and second transistors each having a plurality of electrodes including a base, a collector, and an emitter, said collector and emitter electrodes of said first transistor comprising the output electrodes of said first transistor; circuit means including said output electrodes interconnecting the output terminals of said source and the input terminals of said load device; means connecting the emitter of said second transistor to one of said load terminals; voltage reference means; means connecting said voltage reference means from the base of said second transistor to the other of said load terminals; potential producing means energizable to produce a potential; means connecting the collector of said second transistor through said potential producing means to said other load terminal so that upon conduction of said second transistor said potential producing means is energized; impedance means; means connecting said impedance means to the base of said first transistor in current controlling relation thereto, and to said potential producing means, so that upon energization of said potential producing means said impedance means cuts off the conduction of said first transistor.

2. Regulating means for supplying current from an unregulated source to a load device comprising: transistor means having a plurality of electrodes including a collector, an emitter, and a base, said collector and emitter electrodes comprising transistor output electrodes; circuit means including said output electrodes interconnecting the output terminals of said source and the input terminals of said load device; voltage reference means; current controlling means energizable to conduct current therethrough; potential producing means energizable to produce a potential; means connecting said current controlling means and said potential producing means in series across said load terminals, whereby the conduction of said current controlling means results in the energization of said potential producing means; means connecting said voltage reference source to said current controlling means in controlling relation thereto so that the current controlling means is maintained cutoff until the potential across said load device exceeds a predetermined value; impedance means; means connecting said impedance means to the base of said transistor means and to said potential producing means, so that the conduction of said transistor means is cutoff upon energization of said potential producing means.

3. Voltage regulator means for supplying current from a current source to a load device comprising: first, second, and third transistors each having a plurality of electrodes including a base, a collector, and an emitter, said collector and emitter electrodes comprising the output terminals of said transistors; means for connecting one of said output terminals of said first transistor to a first terminal of said current source; means for connecting the other output terminal of said first transistor to a first terminal of a load device; means for connecting a second load terminal to the second terminal of said source; means connecting the emitter of said second transistor to one of said load terminals; voltage reference means connected from the base of said second transistor to the other of said load terminals; impedance means connected between the collector of said second transistor and said other load terminal; means directly connecting one of the output electrodes of said third transistor to the base of said first transistor; means connecting the other output electrode of said third transistor to the second source terminal; and a zener diode connecting the base of said third transistor to one of the output electrodes of said second transistor.

4. Means for supplying current from a current source to a load device comprising; first, second, and third transistors each having a plurality of electrodes including a base, a collector and an emitter; means for connecting the emitter of said first transistor to the positive terminal of said source; means for connecting the collector of said first transistor to the positive terminal of said load; means for connecting the negative load terminal to the negative terminal of said source; means connecting the emitter of said second transistor to the positive terminal of said load device; voltage reference means connected between said base of said second transistor and the negative terminal of said load; impedance means connected between said collector of said second transistor and the negative terminal of said load; means directly connecting the emitter electrode of said third transistor to the base of said first transistor; means connecting the collector of said third transistor to the negative source terminal; and a zener diode connecting the base of said third transistor to the collector of said second transistor.

5. Means for supplying current from a current source to a load device comprising: first, second, and third transistors each having a plurality of electrodes including a base, a collector, and an emitter, said collector and emitter electrodes comprising the output terminals of said transistors; means for connecting one of said output terminals of said first transistor to a first terminal of said source; means for connecting the other output terminal of said first transistor to a first terminal of a load device; means for connecting the second load terminal to the second terminal of said current source; means connecting the emitter of said second transistor to one of said load terminals; voltage reference means connected from the base of said second transistor to the other of said load terminals; means connecting the collector of said second transistor to said other load terminal; means directly connecting one of the output electrodes of said third transistor to the base of said first transistor; means connecting the other output terminal of said third transistor to the second source terminal; asymmetrical conducting means connected from the base electrode of said third transistor to the base electrode of said first transistor; a zener diode; capacitor means; means including said zener diode and said capacitor means connecting the base of said third transistor to one of the output electrodes of said second transistor.

6. Means for supplying current from a current source to a load device comprising; first, second and third transistors each having a plurality of electrodes including a base, a collector and an emitter; means for connecting the emitter of said first transistor to the positive terminal of said source; means for connecting the collector of said first transistor to the positive load terminal; means for connecting the negative load terminal to the negative terminal of said source; means connecting the emitter of said second transistor to the positive terminal of said load device; voltage reference means connected between the base of said second transistor and the negative terminal of said load; impedance means connected between said collector of said second transistor and the negative terminal of said load; means directly connecting the emitter electrode of said third transistor to the base of said first transistor; means connecting the collector of said third transistor to the negative source terminal; asymmetrical conducting means connected between the base electrodes of said third and first transistors; a zener diode; impedance means; means including said zener diode and said last named impedance means connecting the base of said third transistor to the collector of said second transistor.

7. Regulating means for supplying current from a current source to a load device comprising; first, second and third transistors each having a plurality of electrodes including a base, a collector, and an emitter; means for connecting the emitter of said first transistor to the positive terminal of said source; circuit means for connecting the collector of said first transistor to the positive load terminal; means for connecting the negative load terminal to the negative terminal of said source; means connecting the emitter of said second transistor to said circuit means; voltage reference means; means connecting said voltage reference means from the base of said second transistor to said load device; impedance means connected between the collector of said second transistor and the negative terminal of said load; means directly connecting the emitter electrode of said third transistor to the base of said first transistor; means connecting the collector of said third transistor to the negative source terminal; capacitor means; resistive means; means including said capacitor means and said resistive means connecting the base of said third transistor to the collector of said second transistor.

8. Voltage regulator means for supplying current from a current source to a load device comprising; first and second transistors each having a plurality of electrodes including a base, a collector, and an emitter; means for connecting the emitter of said first transistor to the positive terminal of said source; means for connecting the collector of said first transistor to the positive load terminal; means for connecting the negative load terminal to the negative terminal of said source; means connecting the emitter of said second transistor to the positive terminal of said load device; voltage reference means connected between the base of said second transistor and the negative terminal of said load; transistor multivibrator means comprising a pair of transistors, each of said pair of transistors having a collector, an emitter and a base; means including a resistor and a capacitor connecting the base of each of said pair of transistors respectively to the collector of the other; means connecting the collector of each of said pair of transistors to the negative source terminal; means connecting the collector of said second transistor to the emitter of one of said pair of transistors; and means connecting the base of said first transistor to the emitter of the other of said pair of transistors.

9. Regulating means for supplying current from a current source to a load device comprising; first and second transistors each having a plurality of electrodes including a base, a collector and an emitter, said collector and emitter electrodes comprising the output terminals of said transistor; means connecting one of said output terminals of said first transistor to a first terminal of said current source; means connecting the other output terminal of said first transistor to a first terminal of a load device; means connecting a second terminal of said load to the second terminal of said source; means connecting the emitter of said second transistor to one of said load terminals; voltage reference means connected from the base of said second transistor to the other of said load terminals; zener diode means; means connecting said zener diode means from the base electrode of said first transistor to the collector electrode of said second transistor.

10. Regulating means for supplying current from a current source to a load device comprising; first and second transistors each having a plurality of electrodes including a base, a collector, and an emitter; means connecting the emitter of said first transistor to the positive terminal of said source; means connecting the collector of said first transistor to a first terminal of said load; means connecting the second terminal of said load to the negative terminal of said source; means connecting the emitter of said second transistor to the first terminal of said load device; voltage reference means; means connecting said voltage reference means between the base of said second transistor and the second terminal of said load; impedance means connected between the collector of said second transistor and the second terminal of said load; zener diode means; means connecting said zener diode means from the base of said first transistor to the collector of said second transistor.

11. Voltage regulator apparatus comprising; input means including terminals to be connected to a source of unregulated direct current potential; output terminals connected to load means requiring a regulated potential; first transistor means having its output terminals connected in series with one of said input terminals; second transistor means; reference potential means; circuit means connecting said second transistor means to said reference means and said output terminals such that said second transistor means becomes conductive upon the regulated output potential exceeding said reference potential; and further circuit means connecting said first transistor means to said second transistor means; said further circuit means switching said first transistor to a non-conductive state upon the conduction of said second transistor.

12. Voltage regulator apparatus comprising; an input circuit including a pair of terminals to be connected to a source of unregulated potential; transistor switch means connected to said input circuit; electrical filter means connected to the output of said transistor switch means; output means connected to said filter means; potential reference means; transistor control means; circuit means connecting said transistor control means to compare the potential across said output means with said potential reference means; further circuit means connecting said transistor control means in current controlling relation to said transistor switch means, so that said transistor control means controls the operation of said transistor switch means in response to the relation of said output potential and said reference potential.

No references cited.